Patented Nov. 10, 1931

1,830,852

UNITED STATES PATENT OFFICE

HEINRICH NERESHEIMER AND WILHELM SCHNEIDER, OF LUDWIGSHAFEN-ON-THE-RHINE, GERMANY, ASSIGNORS TO GENERAL ANILINE WORKS INC., OF NEW YORK, N. Y., A CORPORATION OF DELAWARE

VAT DYESTUFFS OF THE N-DIHYDRO 1.2.2':1' ANTHRAQUINONEAZINE SERIES

No Drawing. Application filed July 8, 1929, Serial No. 376,840, and in Germany July 20, 1928.

The present invention relates to new vat dyestuffs of the N-dihydro-1.2.2'.1'-anthraquinoneazine series.

We have found that the products obtainable by treating N-dihydro-1.2.2'.1'-anthraquinoneazines with formaldehyde which term is to be understood as also comprising agents supplying formaldehyde, for example paraformaldehyde, in an acid medium, such products being for example described in the British specification No. 20527 A. D. 1904, are converted by oxidation into new vat dyestuffs, which are more readily soluble in concentrated sulphuric acid with an olive to olive green coloration and dye essentially more greenish shades than the initial material, the shades assuming a still more greenish tinge, when treated with a dilute solution of a hypochlorite. The oxidation may be carried out, for example, by means of acid or alkaline oxidizing agents, or the initial materials may also first be treated with alkaline agents alone, whereby the new dyestuffs are obtained in the form of their leuco compounds which are then further oxidized by any known or suitable method to the dyestuffs themselves. Thus, for example, the condensation product of N-dihydro-1.2.2'.1'-anthraquinoneazine with paraformaldehyde is converted into the leuco compound of a vat dyestuff which dyes in greenish blue shades by the action of aqueous potassium hydroxide solution.

In accordance with the present invention the preparation of the initial material and the further treatment thereof can be carried out in one operation.

The following examples will further illustrate the nature of the said invention but the invention is not restricted to these examples. The parts are by weight.

Example 1

5 parts of paraformaldehyde are introduced at from 5° to 10° C. while stirring into a solution of 10 parts of N-dihydro-1.2.2'.1'-anthraquinoneazine in 100 parts of 96 per cent sulphuric acid, and the whole is stirred for several hours at the same temperature, and then for several hours at from 20° C. to 25° C. It is then poured into a solution of 16 parts of potassium bichromate in 2000 parts of water and slowly warmed to about 100° C. After working up, the new dyestuff, which dissolves in concentrated sulphuric acid to give an olive green solution, is obtained in the form of a greenish blue paste dyeing cotton fast very greenish blue shades from a blue vat which assume a still more greenish tinge, when treated with a solution of hypochlorite.

Example 2

An approximately 10 per cent paste of the condensation product of N-dihydro-1.2.2'.1'-anthraquinoneazine and formaldehyde obtained as described in the British specification No. 20527 A. D. 1904 is mixed with an equal weight of ground caustic potash and the mixture is stirred for about an hour at from 110° to 120° C. The new vat dyestuff, which is present in the reaction mixture partly in the form of the leuco compound, can be completely separated, after dilution with water, for example by means of air. The dyeings are somewhat less green than those described in Example 1.

Example 3

10 parts of pure N-dihydro-1.2.2'.1'-anthraquinoneazine are dissolved while stirring in 100 parts of a 96 per cent sulphuric acid, 2 parts of paraformaldehyde then being introduced at from 5° to 10° C. into the solution. After several hours a suspension of 6 parts of a 90 per cent manganese dioxide mineral in 80 parts of a 96 per cent sulphuric acid is introduced at the same temperature; stirring is continued at from 15° to 20° C. until practically the whole manganese dioxide is used up, and the reaction mass is diluted with the same weight of a 62 per cent sulphuric acid solution. After the mass has cooled down to 40° C., the liquid is removed by suction filtration and the residue containing small amounts of the initial material besides inorganic products is washed with an 80 per cent sulphuric acid. By pouring the sulphuric acid solution into water, an olive green precipitate is obtained, probably being the azine form of the new dyestuff, which, if desired, can be converted into the N-dihydroazine with the aid of reducing agents such as bisulphite. The N-dihydroazine is very similar to the dyestuffs described in Examples 1 and 2, but dissolves in concentrated sulphuric acid with a more greenish coloration and furnishes dyeings of a still more greenish tinge than these.

*Example 4*

18 parts of paraformaldehyde are introduced into a solution of 60 parts of N-dihydro-1.2.2'.1'-anthraquinoneazine in 600 parts of 96 per cent sulphuric acid at between 5 and 10° C. After stirring for several hours the reaction mixture is poured into water and the condensation product is isolated in the usual manner.

50 parts of pyrolusite (containing about 90 per cent of manganese dioxide) are introduced during 1 hour into a solution of 30 parts of the product obtained as beforedescribed in 600 parts of 96 per cent sulphuric acid at 25° C. The reaction mixture is stirred at the said temperature until practically all of the pyrolusite has been consumed. The reaction mixture is then worked up as described in Example 3 and a dyestuff obtained which is practically identical with that described in the said example.

What we claim is:—

1. As new articles of manufacture vat dyestuffs of the anthraquinoneazine series obtainable by oxidizing the products of the treatment of N-dihydro-1.2.2'.1'-anthraquinoneazines with formaldehyde in an acid medium, the new vat dyestuffs being more readily soluble in concentrated sulphuric acid with an olive to olive-green coloration and dyeing cotton essentially more greenish shades than the initial material.

2. As a new article of manufacture the vat dyestuff obtainable by treating with a suspension of manganese dioxide in 96 per cent sulphuric acid the product obtained by the action of paraformaldehyde on N-dihydro-1.2.2'.1'-anthraquinoneazine in 96 per cent sulphuric acid, the new dyestuff dissolving in concentrated sulphuric acid giving an olive green solution and dyeing cotton blue shades with a strong greenish tinge.

In testimony whereof we have hereunto set our hands.

HEINRICH NERESHEIMER.
WILHELM SCHNEIDER.